US012112351B2

(12) United States Patent
Jain

(10) Patent No.: US 12,112,351 B2
(45) Date of Patent: Oct. 8, 2024

(54) CONTEXTUAL TARGETED ADVERTISING PLATFORM METHOD AND DEVICES FOR HEALTHCARE PROFESSIONALS

(71) Applicant: DOCEREE INC., Parsippany, NJ (US)

(72) Inventor: Harshit Jain, Parsippany, NJ (US)

( * ) Notice: Subject to any disclaimer, the term of this patent is extended or adjusted under 35 U.S.C. 154(b) by 0 days.

(21) Appl. No.: 18/078,953

(22) Filed: Dec. 10, 2022

(65) Prior Publication Data
US 2024/0193638 A1 Jun. 13, 2024

(51) Int. Cl.
*G06Q 30/00* (2023.01)
*G06Q 30/0251* (2023.01)

(52) U.S. Cl.
CPC .................. *G06Q 30/0251* (2013.01)

(58) Field of Classification Search
CPC ............................................ G06Q 30/02–0277
See application file for complete search history.

(56) References Cited

U.S. PATENT DOCUMENTS

| 2001/0032125 A1* | 10/2001 | Bhan ............... | G06Q 30/02 705/7.29 |
| 2008/0172252 A1* | 7/2008 | Vovan ............... | G16H 70/20 705/14.19 |
| 2022/0300493 A1* | 9/2022 | Meagher, III ....... | G06F 16/2455 |

FOREIGN PATENT DOCUMENTS

KR 2018/0016026 A * 2/2018

OTHER PUBLICATIONS ip.com titled "Advertising Visual Attention to Facebook Social Network: Evidence from Eye Movements" 2018 International Congress On Advanced Applied Informatics (pp. 68-73) (Year: 2018).*

* cited by examiner

*Primary Examiner* — Raquel Alvarez
(74) *Attorney, Agent, or Firm* — Edmond DeFrank

(57) ABSTRACT

The embodiments disclose a method for displaying contextual targeted advertising to healthcare professionals including receiving in a master database a plurality of words that includes titles and keywords associated with plural distinct medical healthcare professional specialties, generating, with a first processor, plural taxonomy and vocabulary based on the received plurality of words of the plural distinct medical healthcare professional specialties, tracking, with a second processor, a context of frequent browsing and reading history of online life sciences content of a healthcare professional user, identifying, with the second processor, a distinct medical healthcare professional specialty associated with the healthcare professional user based on matches in the master database with the context, comparing, with a third processor, contextual targeted advertising with the matches, and converting, with the third processor, advertising queries from advertisers to displayed targeted advertising presented to healthcare professional user based on the matches.

20 Claims, 15 Drawing Sheets

CONTEXTUAL TARGETED ADVERTISING PLATFORM METHOD AND DEVICES FOR HEALTHCARE PROFESSIONALS

BACKGROUND

Healthcare, like any other discipline, is rapidly evolving around the world and actively leveraging the digital medium to disseminate information about various medical specialties and procedures for health care providers and commoners alike. The taxonomy and vocabulary associated with medical specialties, like the distinct medical practices established across the globe, are themselves distinct in nature. The terminology used by health care providers to describe various health conditions, medical procedures, and disease symptoms, can easily be understood by the medical fraternity and not meant for commoners to comprehend and contemplate upon.

Furthermore, due to the complexity and scale of medical practices, standard medical terms are frequently referred to by their colloquial counterparts, particularly in medical publications and on the internet, for ease of use and comprehension by the intended audience. To date, there is no digital mechanism that creates a functional association between the medical practices prevalent in different countries across the world and the vast body of standardized medical terms and associated informal terms and keywords commonly used in medical parlance.

DETAILED DESCRIPTION OF THE INVENTION

Figure 1:
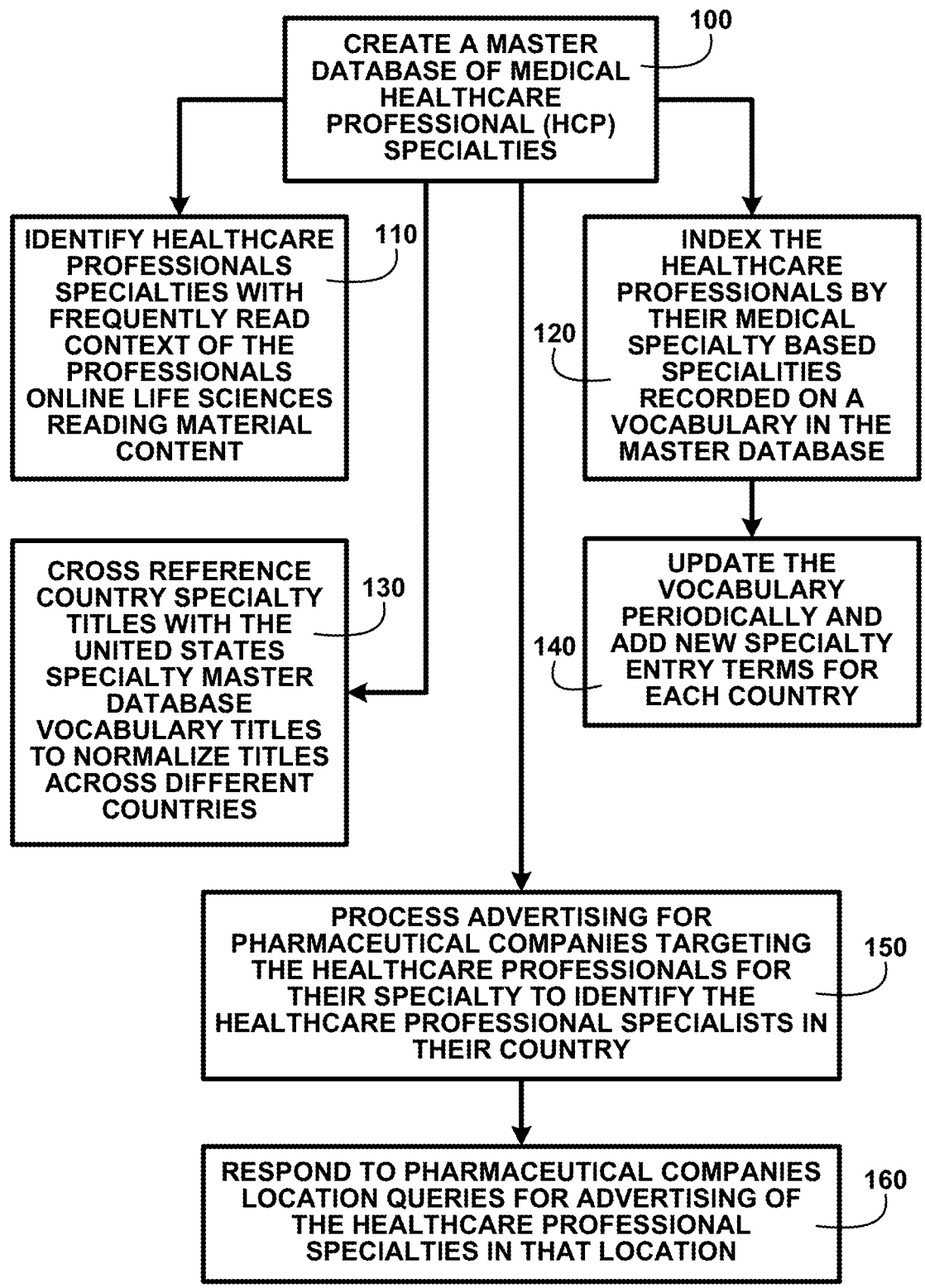
FIG. 1 shows a block diagram of an overview of the high science taxonomy mapping of one embodiment.

In a following description, reference is made to the accompanying drawings, which form a part hereof, and in which is shown by way of illustration a specific example in which the invention may be practiced. It is to be understood that other embodiments may be utilized, and structural changes may be made without departing from the scope of the present invention.

General Overview:

It should be noted that the descriptions that follow, for example, in terms of a method and devices for contextual targeted advertising platform for healthcare professionals are described for illustrative purposes and the underlying system can apply to any number and multiple types of healthcare professionals' (HCP) specialties. In one embodiment of the present invention, the specialized HCP medical taxonomy platform for contextual messaging method and devices can be configured using artificial intelligence and machine learning for identifying the specialty of healthcare professionals based on their online reading patterns. The specialized HCP medical taxonomy platform for contextual messaging method and devices can be configured to include World Wide Web webpages to identify medical healthcare professionals' specialties and can be configured to include a plurality of database (DB) vocabularies in multiple languages with specialties of medical healthcare professionals using the present invention.

In example embodiments described below, a computer system (e.g., a client machine, server machine, etc.) configured by an application may constitute a "module" or "processor" that is configured and operates to perform certain operations as described herein below. Accordingly, the term "module" and/or "processor" should be understood to encompass a tangible entity, be that an entity that is physically constructed, permanently configured (e.g., hardwired) or temporarily configured (e.g., programmed) to operate in a certain manner and to perform certain operations described herein. In addition, the platform can be configured to incorporate a network with a remote sever coupled to a private or public cloud (e.g., Internet), which can be connected to a remote computer and/or remote mobile devices. The platform can have a client-server architecture that provides server-side functionality, via a network (e.g., the Internet, a public or private telephone network (wireline or wireless), a private wireless network using technologies such as Bluetooth or IEEE 802.11x or other networks). In a client-server architecture, a network block being a web client (e.g., a web browser) can be executing on client machine, e.g., on a network-based device. A device application or a programmatic client may also execute on the client machine.

Embodiments are not limited to a client server architecture, and could equally well find applications in a distributed, or peer-to-peer, or like architectural systems. The network blocks, including network-based device(s), may include a mobile device, a computer, a laptop computer, a desktop computer, a personal digital assistant, a cellular telephone, a communications device, a wireless telephone, a land-line telephone, a control system, a camera, a scanner, a television, television cable, a telephone with a web browser, a facsimile machine, a printer, a pager, and/or a personal trusted device. The platform can may include any device capable of Short Messaging Service (SMS) messaging, multimedia messaging service (MMS) messaging, social media direct messages (DM) and the like.

The device may be browser-enabled. The communication session between a client machine and the network-based system may involve multiple technology modalities, e.g. the client user may engage the system via SMS and receive a responsive communication as an SMS with an embedded hyperlinked URL directing the client user's device to a web page. A hyperlinked URL may be delivered directly to the device from the application server(s) and may be used to access a web site or any web browser. The platform can include enabled mobile videophone communications, virtual reality system, augmented reality systems, digital smart televisions, and/or digital live and recorded web casts. The device may also include a receiver to receive near field communications.

In one embodiment of the present invention, a custom digital mechanism is included whereby specialties of health care professionals, across the world (in different countries), can be identified and coupled with corresponding standard medical taxonomy and associated colloquial keywords and terms. This creates a dynamic relational database of contextual terms that can then put to various applications. In one embodiment, the present invention is used as advertising and marketing tools. In another embodiment, the present invention is used to identify members of a medical specialty. In one embodiment, the contextual targeted advertising platform for healthcare professionals brings together the terms from a controlled vocabulary with specialties of medical healthcare professionals with the help of subject matter expertise, online research, and innovative technology.

FIG. 1 shows a block diagram of an overview of the high science taxonomy mapping of one embodiment. FIG. 1 shows a process to create a master database of medical healthcare professional specialties 100. HCPs can access a database with recorded life sciences materials downloaded from the internet using a communication device that is coupled to a platform. The recorded life sciences materials are updated periodically from the internet. The updated real-time life sciences information provides the HCPs with updated materials for their specialties to review. A centralized source of specialty information saves the HCPs time and makes it easier to find advances in their specialty.

The specialties of an individual healthcare professional can be discerned from the life sciences information they are reading which is tracked to identify using the context of the professional's online reading material content 110. The HCP tracked life sciences reading material content is parsed and processed with a processor to search for matches in the master database. HCP URL, location and specialty is recorded in a HCP database. The HCP database is processed with a processor to determine a search method to index the healthcare professionals' by medical specialty based on a vocabulary on the master database 120. The life sciences information is collected from life science brands that produce advances in instruments, equipment and treatments and pharmaceutical companies.

In one embodiment a graphic processor to process advertising for pharmaceutical companies targeting the healthcare professionals for their specialty to identify the healthcare professional specialists in their country 130. The advertising can be targeted by for example a pharmaceutical company to HCPs URL addresses of HCPs identified in the targeted specialty. The platform server is set to for example weekly update the vocabulary periodically and add new entry terms for each country 140. A platform computer in one embodiment prepares a cross-reference country specialty titles with US specialty master database vocabulary titles 150. Examples of medical specialties are listed for illustrative purposes and include a partial list of Urology, Oncology, Neurology, Pathology, Radiology, Cardiology, Hepatology, Immunology, Nephrology, and Allergology. The platform server is configured to respond to pharmaceutical companies' location queries with advertising for the healthcare professional specialties 160.

The contextual targeted advertising platform for healthcare professionals brings together medical specialties across the globe to a common platform (master database). These specialties are associated with corresponding medical terms. The contextual targeted advertising platform for healthcare professionals enriches this unique specialty/terminology data on an ongoing basis. The contextual targeted advertising platform for healthcare professionals creates value in different commercial propositions including pharma advertising of one embodiment.

Figure 2:
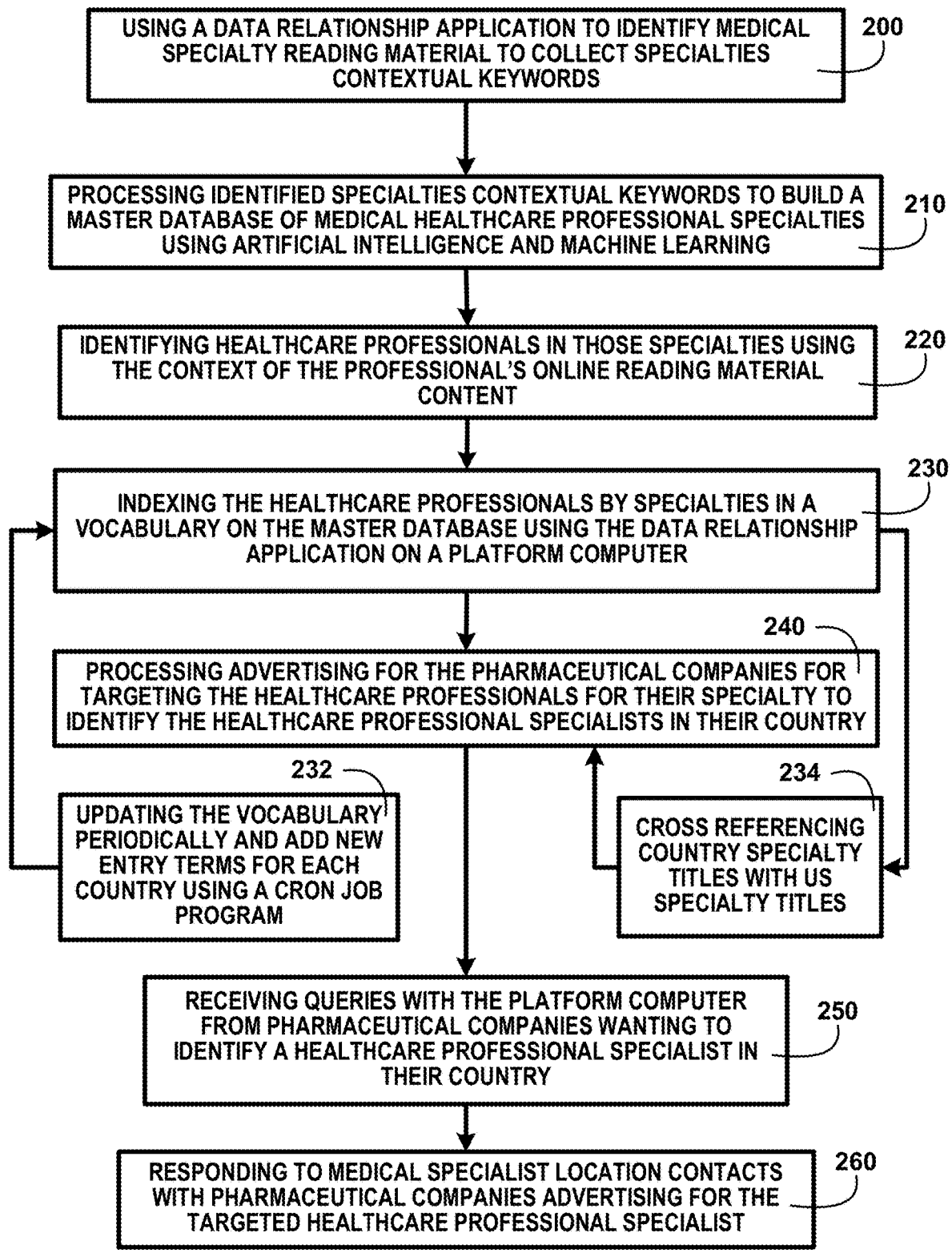
FIG. 2 shows a block diagram of an overview flow chart of keywords mapping of one embodiment.

Detailed Description:

FIG. 2 shows a block diagram of an overview flow chart of keywords mapping of one embodiment. FIG. 2 shows using a data relationship application to identify medical specialty reading material to collect specialties contextual keywords 200. The data relationship application is installed on a platform computer and coupled to a platform server. A platform processor is used for processing identified specialties contextual keywords to build a master database of medical healthcare professional specialties using artificial intelligence and machine learning 210. Identifying healthcare professionals in those specialties using the context of the professional's online reading material content 220. A processor is used to facilitate searches with indexing the healthcare professionals by specialties in a vocabulary on the master database using the data relationship application on a platform computer 230.

The platform server is scheduled for updating the vocabulary periodically and adding new entry terms for each country using a scheduling tasks job program 232. HCP specialties are seen world-wide. Different countries and language translations can create confusion if determine how a specialty is referred to at each GEO location. To normalize the nomenclature used to refer to the same specialty a processor produces cross-referencing country specialty titles with US specialty titles 234.

The normalized US specialty titles provides uniform classification for processing advertising for the pharmaceutical companies for targeting the healthcare professionals for their specialty to identify the healthcare professional specialists in their country 240. The cross referenced indexed healthcare professionals by specialties can be used for queries with the platform computer from pharmaceutical companies wanting to identify a healthcare professional specialist in their country 250. HCPs can be appraised of advances in their specialty by responding to medical specialist location contacts with pharmaceutical companies advertising for the targeted healthcare professional specialist 260 of one embodiment.

Figure 3:
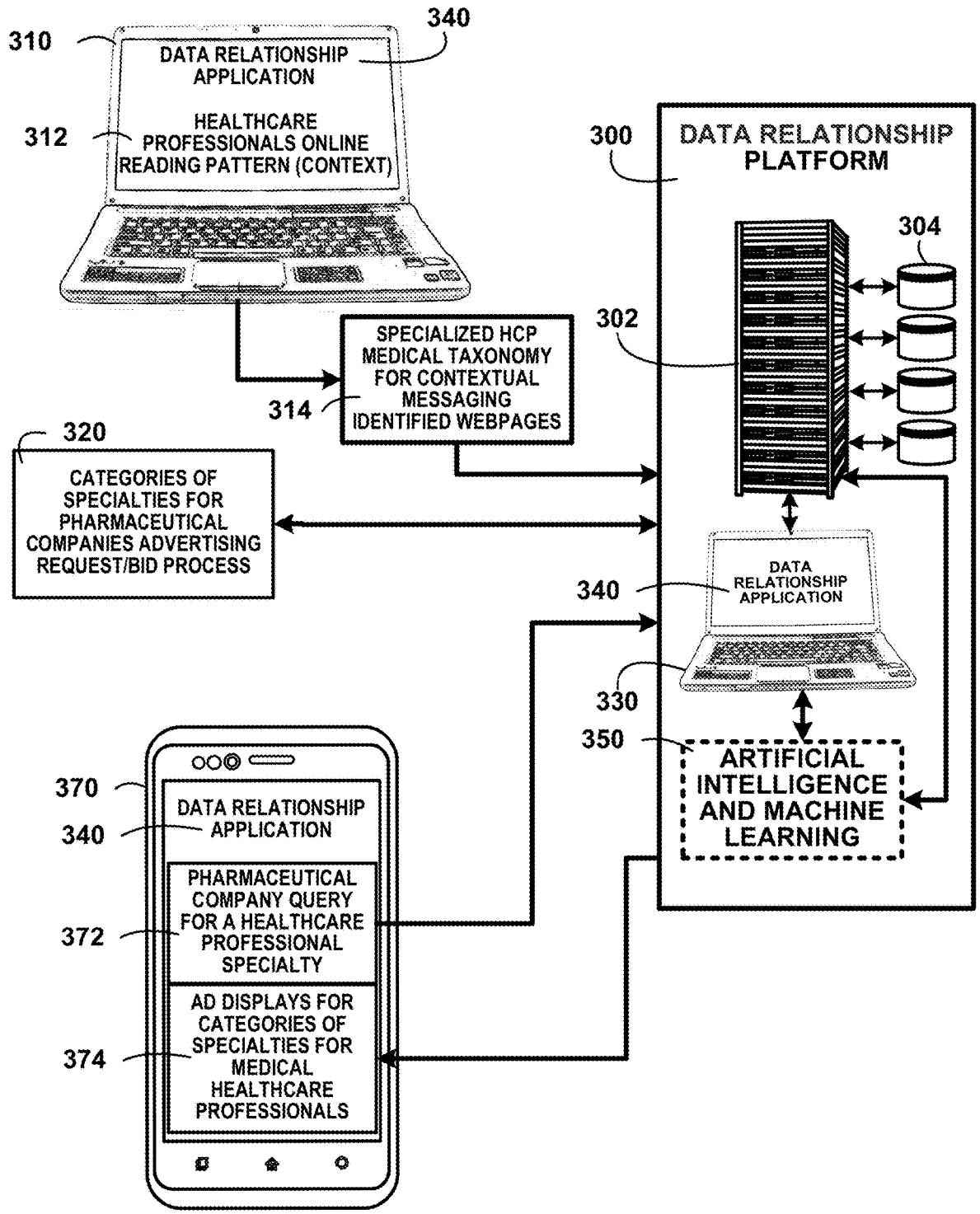
FIG. 3 shows for illustrative purposes only an example of the data relationship structure of one embodiment.

Data Relationship Structure:

FIG. 3 shows for illustrative purposes only an example of the data relationship structure of one embodiment. FIG. 3 shows a healthcare professional computer 310 with a data relationship application 340. The data relationship application can installed on the healthcare professional computer 310 may be the device for a healthcare professional to read updates on their specialty. The healthcare professionals' online reading pattern (context) 312 is tracked by the data relationship application 340. The tracked reading identified webpages 314 are sent to a data relationship platform 300.

The tracked reading identified webpages 314 are processed by the data relationship platform 300.

The data relationship platform 300 comprises a plurality of servers 302, a plurality of databases 304, platform computer 330 with the data relationship application 340, artificial intelligence and machine learning 350 devices. The artificial intelligence and machine learning 350 devices use an application programming interface (API) for keyword extraction and refinement (parse data from xml level wise). Keywords extracted are processed and are determined to be a segment of the specialty for that healthcare professional. The specialty keywords are associated with the healthcare professional's specialty for searches and for a specialist in a specific field of practice.

Categories of specialties for pharmaceutical companies advertising request/bid process 320 is used to provide specialty targeted advertising capability for the pharmaceutical companies. The platform computer 330 with the data relationship application 340 communicates with the pharmaceutical companies to develop the advertising.

Pharmaceutical companies wanting to identify a healthcare professional specialist in their country can make a pharmaceutical company query for healthcare professional specialty 372 with a user smartphone 370. The artificial intelligence and machine learning 350 processes the query to locate in the master DB 460 of FIG. 4 the specialty keywords that match the query in that country and the healthcare professionals associated with that specialty indexed by the specialties. The data relationship application 340 transmits a response to the pharmaceutical company query for a healthcare professional specialty 372. The query response to the user smartphone 370 includes ad displays for categories of specialties for medical healthcare professionals 374 in that country. The ads displayed can include the contact information for the pharmaceutical company for engagement of one embodiment.

Figure 4:
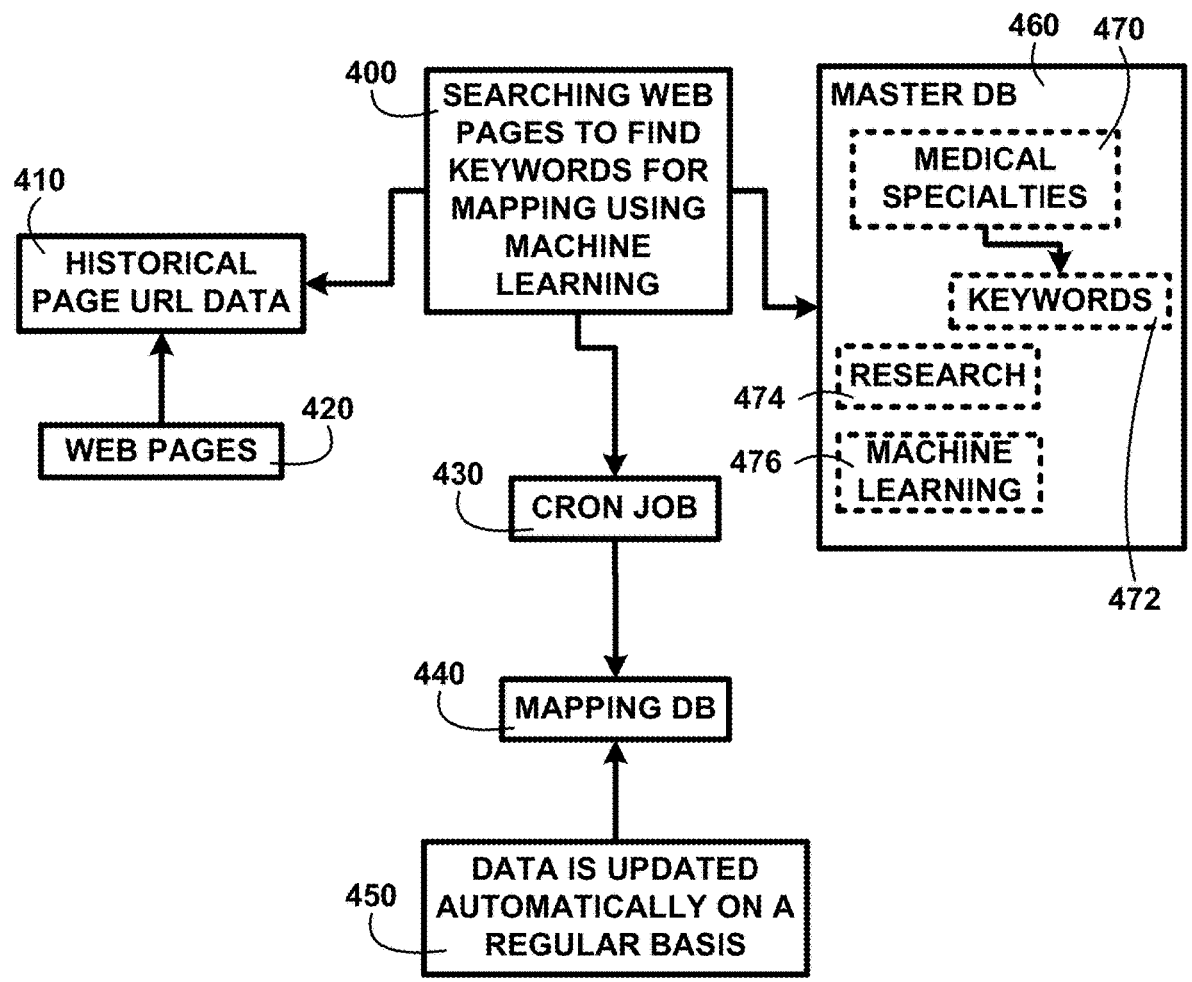
FIG. 4 shows a block diagram of an overview flow chart of keywords mapping of one embodiment.

Keywords Mapping:

FIG. 4 shows a block diagram of an overview flow chart of keywords mapping of one embodiment. FIG. 4 shows searching web pages to find keywords for mapping using machine learning 400. The mapping of keywords extends to searching books and journals in life sciences for subject indexing to record in a medical subject heading controlled and comprehensive vocabulary database. The vocabulary database includes historical page URL data 410 from web pages 420 previously searched. Updating the keywords with a scheduling tasks job 430 is performed every day at the same time and the results are recorded in a mapping DB 440. The data is updated automatically on a regular basis 450 and also recorded in a master DB 460. The keywords 472 research 474 details data associated with medical specialties 470. Machine learning 476 is used to map the keywords association to the medical specialties 470 of one embodiment.

Creating a high science taxonomy mapping between the specialties of a particular country with the master DB 460 includes researching a specialty list of any country. A hierarchy tree for that country's specialty is created. If a new specialty exists but is not mentioned in the current master DB 460, the work profile of that specialty is researched and then matched with the existing set of keywords. For example, a General Practitioner (in the US) and General Physician (in India). The new specialty is identified with the existing set of keywords to which the new specialty belongs. A new table of specialties is created associated with the country. The new set of specialties for the country is mapped with the master DB 460 of one embodiment.

Figure 5:
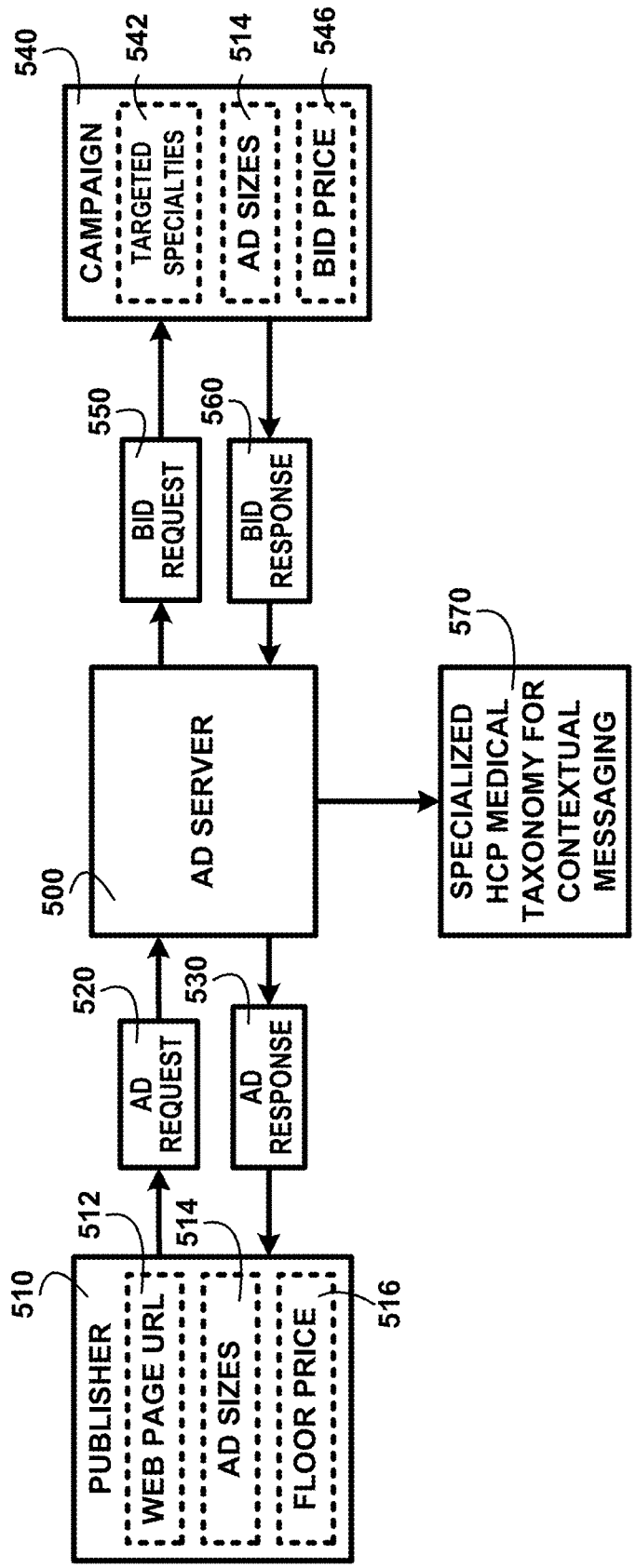
FIG. 5 shows a block diagram of an overview of the use case diagram of one embodiment.

Use Case Diagram:

FIG. 5 shows a block diagram of an overview of a use case diagram of one embodiment. FIG. 5 shows a use case diagram example with an ad server 500 for viewing healthcare professionals' advertisements on a data relationship application. The ad server 500 uses a publisher 510 to determine a web page URL 512, ad sizes 514, and a floor price 516 for ads for healthcare professionals.

The publisher 510 determinations data is conveyed in an ad response 530 to a healthcare professional ad request 520. A healthcare professional may want to create an ad campaign 540. The ads will include targeted specialties 542 master DB 460 of FIG. 4. The campaign 540 bid request 550 may include various ad sizes 514 for which a bid price 546 is calculated for a bid response 560. The contextual targeted advertising platform for healthcare professionals 570 may propose textual ad content based on the vocabulary database and specialty keywords from the master DB 460 of FIG. 4 of one embodiment.

Figure 6:
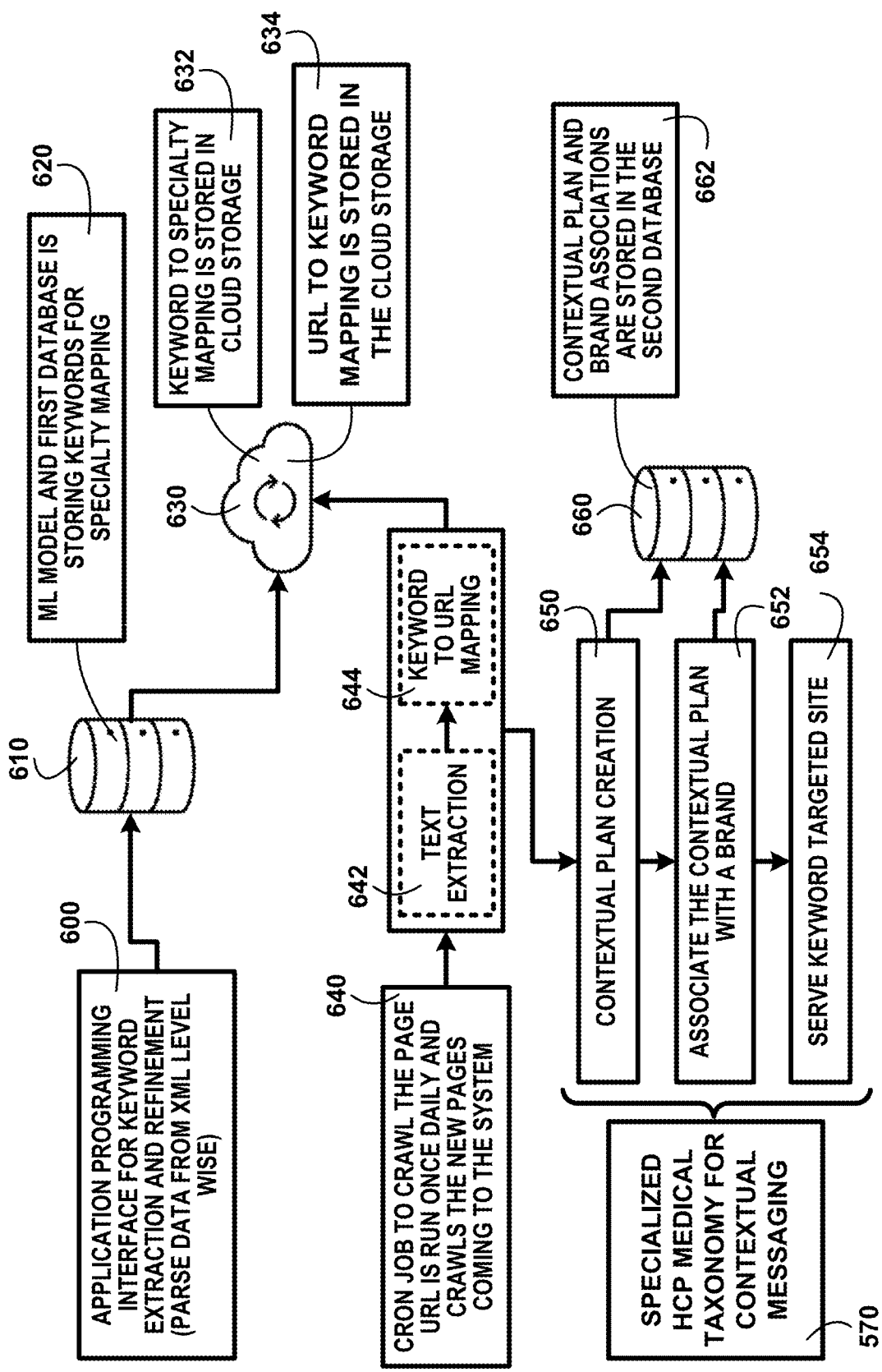
FIG. 6 shows for illustrative purposes only an example of an architecture diagram of one embodiment.

Architecture Diagram:

FIG. 6 shows for illustrative purposes only an example of an architecture diagram of one embodiment. FIG. 6 shows an application programming interface (API) for keyword extraction and refinement (parse data from xml level wise) 600. Updating the specialty mapping is an ongoing activity and is done periodically. New entry terms are added to the database, which is picked up by the Artificial Intelligence (AI) scheduling tasks job and added to the master DB 460 of FIG. 4, the keyword to the specialty mapping database.

The API is a set of functions and procedures allowing the creation of applications that access the features or data of an operating system, application, or other services. A machine learning (ML) device of the ML model and first database 610 receives data extracted with the API. The ML model and first database is storing keywords for specialty mapping 620.

The API extracted data is processed with the ML model and first database 610 and the results are stored in cloud storage 630. A keyword to specialty mapping is stored in the cloud storage 632. Also, URL to keyword mapping is stored in the cloud storage 634. A scheduling tasks job is configured to crawl each page URL once daily and to crawl the new pages coming to the system 640. The scheduling tasks job performs text extraction 642 for the keyword to URL mapping 644. The contextual targeted advertising platform for healthcare professionals 570 consists of steps including a contextual plan creation 650, a process to associate the contextual plan with a brand 652, and to associate a serve keyword targeted site 654. A second database 660 records the contextual targeted advertising platform for healthcare professionals 570 process results. The contextual plan and brand associations are stored in the second database 662 of one embodiment.

Figure 7:
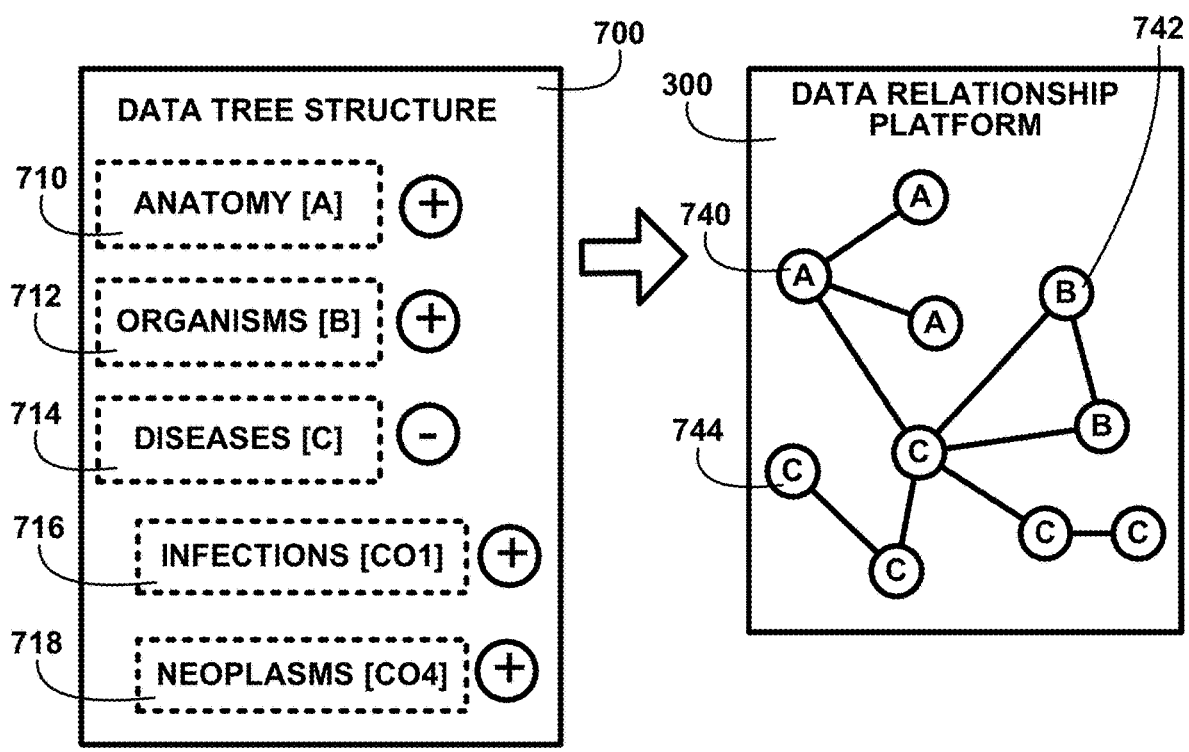
FIG. 7 shows for illustrative purposes only an example of the data tree structure of one embodiment.

Data Tree Structure:

FIG. 7 shows for illustrative purposes only an example of the data tree structure of one embodiment. FIG. 7 shows a data tree structure 700. An example of the data tree structure 700 shows anatomy [A] 710, organisms [B] 712, and diseases [C] 714. The data tree structure 700 shows subheadings, for example, of diseases [C] 714 with subheadings including infections [co1] 716 and neoplasms [co4] 718. FIG. 7 also shows a data relationship network 730. The data relationship platform 300 illustrates how the headings relate to one another for different specialties as indicated by the lines connecting A 740, B 742, and C 744 referencing anatomy [A] 710, organisms [B] 712, and diseases [C] 714 of one embodiment.

Figure 8:
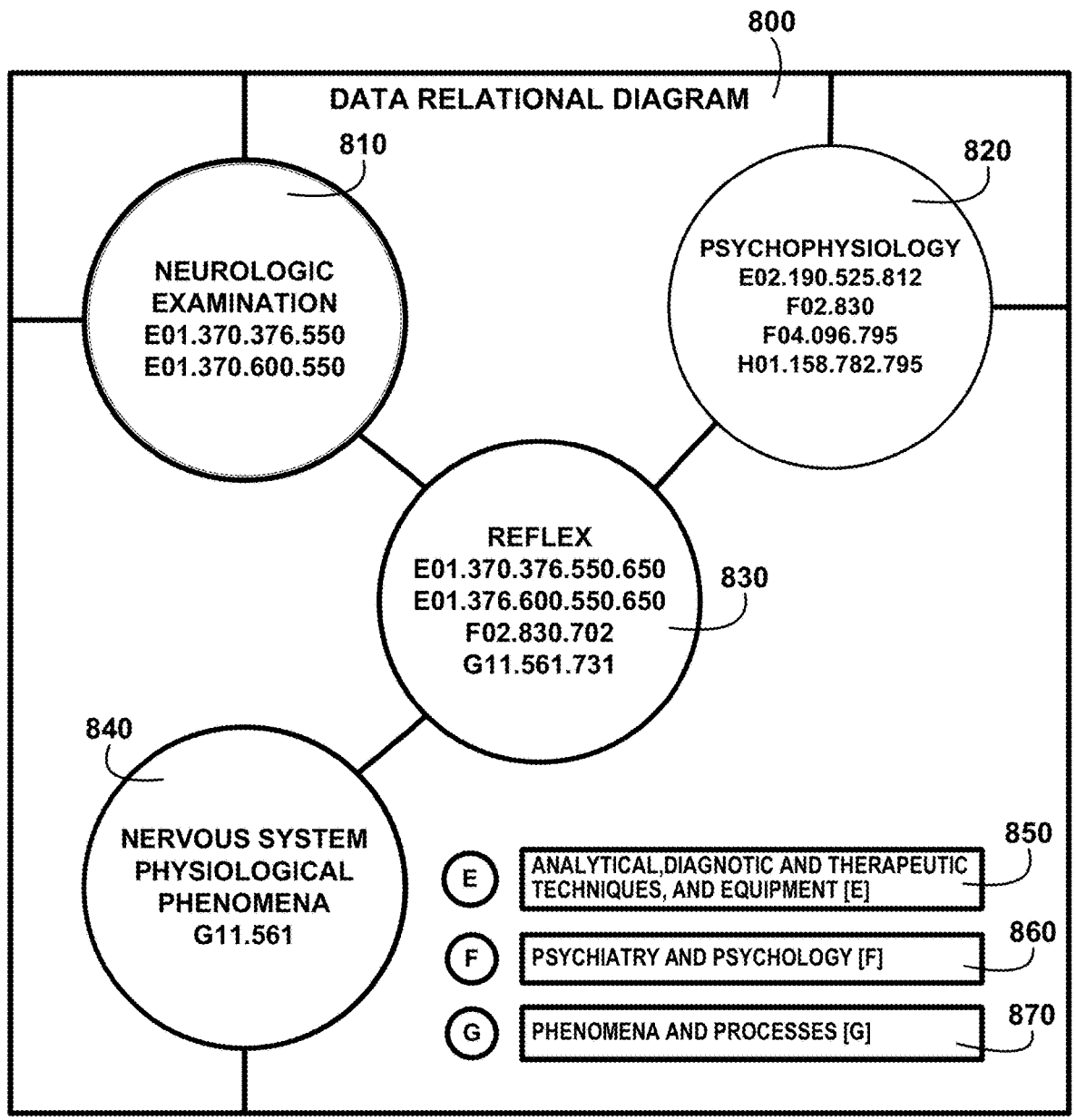
FIG. 8 shows for illustrative purposes only an example of the data relational diagram of one embodiment.

Data Relational Diagram:

FIG. 8 shows for illustrative purposes only an example of the data relational diagram of one embodiment. FIG. 8 shows a construction of the data relational diagram 800. For example, neurologic examination E01.370.376.550 E01.370.600.550 810, psychophysiology E02.190.525.812 F02.830 F04.096.795 H01.158.782.795 820, reflex E01.370.376.550.650 E01.376.600.550.650 F02.830.702 G11.561.731 830, and nervous system physiological phenomena G11.561 840.

In this example, the letters indicate a type of process or procedure, for example, analytical, diagnostic, and therapeutic techniques, and equipment [E] 850, psychiatry and psychology [F] 860, and phenomena and processes [G] 870. Also, in these examples reflex has four tree numbers including E01.370.376.550.650, E01.370.600.550.650, F02.830.702, and G11.561.731. The Neurologic Examination (E01.370.376.550, E01.370.600.550) can be obtained when the last three digits (.650 and .650) of reflex (E01.370.376.550.650, E01.370.600.550.650) are removed. The category (label) of each heading is the node of its corresponding tree numbers of one embodiment.

Figure 9:
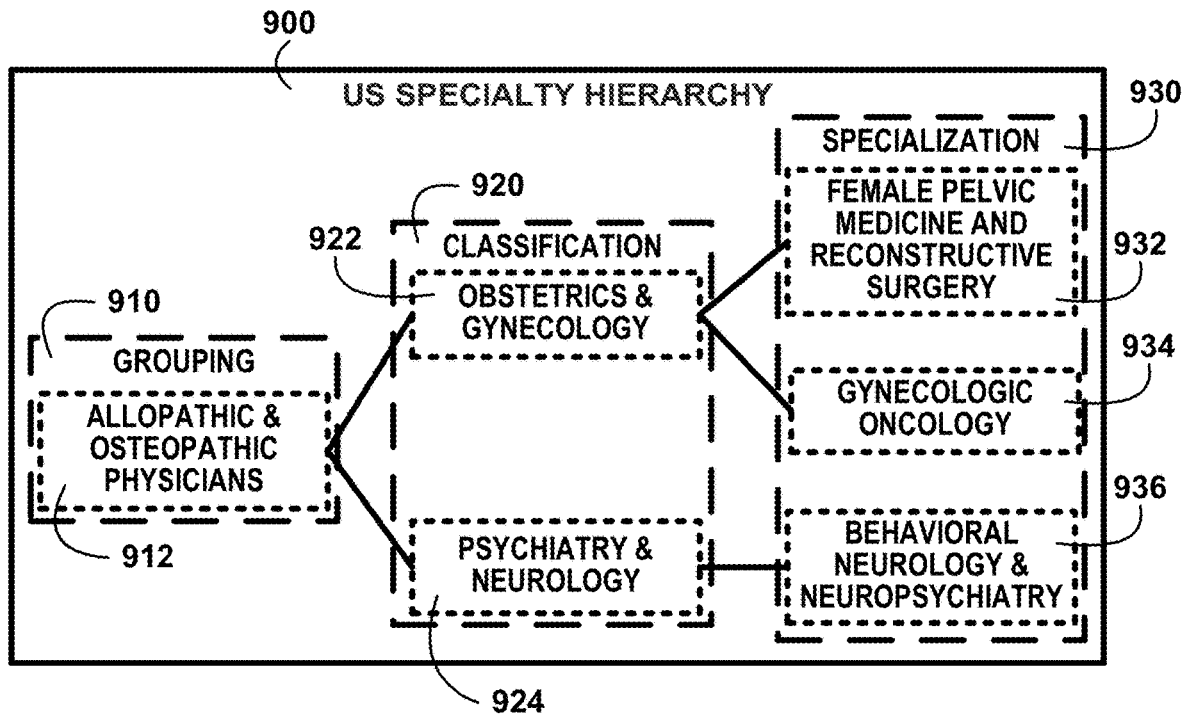
FIG. 9 shows a block diagram of an overview of US specialty hierarchy of one embodiment.

US Specialty Hierarchy:

FIG. 9 shows a block diagram of an overview of the US specialty hierarchy of one embodiment. FIG. 9 shows an example of a US specialty hierarchy 900. The US specialty hierarchy 900 includes a grouping 910, classification 920, and specialization 930. In grouping 910 the example shows allopathic & osteopathic physicians 912. The classification 920 shows obstetrics & gynecology 922 and psychiatry & neurology 924. Under specialization 930 for obstetrics & gynecology, 922 examples of specialization 930 include female pelvic medicine and reconstructive surgery 932 and gynecologic oncology 934. Additionally, under psychiatry & neurology 924 the US specialty hierarchy 900 shows behavioral neurology & neuropsychiatry 936.

A doctor specialties database is created to normalize doctor specialties names. Various medical specialists exist around the world. Though the function of doctors is the same, across the globe the name of the specialty differs from place to place. Like in the US these specialties are highly defined but in a country like India, it is superficial.

The specialties of different countries must be normalized, that is, brought to a common platform where the specialty of, for example, a medical specialist maps to the corresponding specialty of a health care professional in the US. As medical specialties in the US are classified at a much more granular level than the specialties of medical professionals around the world, high science taxonomy mapping the specialties of professionals from other countries to that of the specialties of US doctors is performed with a processor and stored in the master database 760 of FIG. 7.

Figure 10:
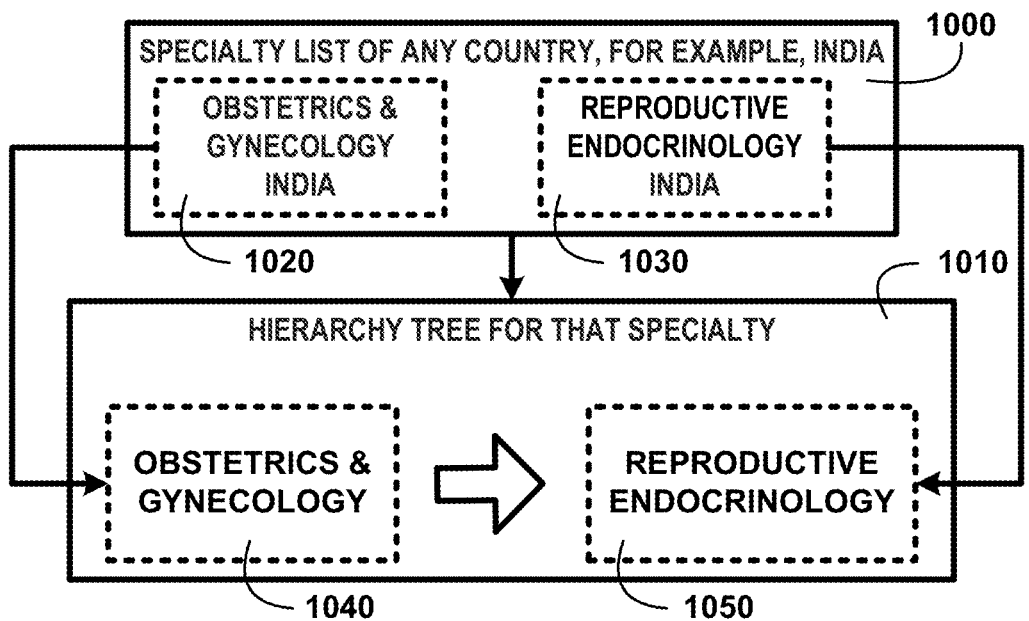
FIG. 10 shows a block diagram of an overview of the specialty list of any country, for example, India of one embodiment.

Specialty List of any Country, for Example, India:

FIG. 10 shows a block diagram of an overview of the specialty list of any country, for example, India of one embodiment. FIG. 10 shows a specialty list of any country, for example, India 1000. A hierarchy tree for that specialty is created for India. A hierarchy tree structure is a graphical form resembling a tree with branches. The hierarchy is determined with the main heading is the medical field followed by specialties and subspecialties. A specialty list for India of a few examples is shown in a hierarchy tree for that specialty 1010.

Two specialties include obstetrics & gynecology India 1020 and reproductive endocrinology India 1030. The hierarchy tree for that specialty 1010 will show obstetrics & gynecology 1040 with a subheading for reproductive endocrinology 1050. The hierarchy tree for different countries follows that of the US with three sections, namely: the Grouping that the specialty is a part of, the Classification of the specialty, and finally the actual Specialization as we go down this hierarchy, the medical specialization becomes more specific of one embodiment.

Figure 11:
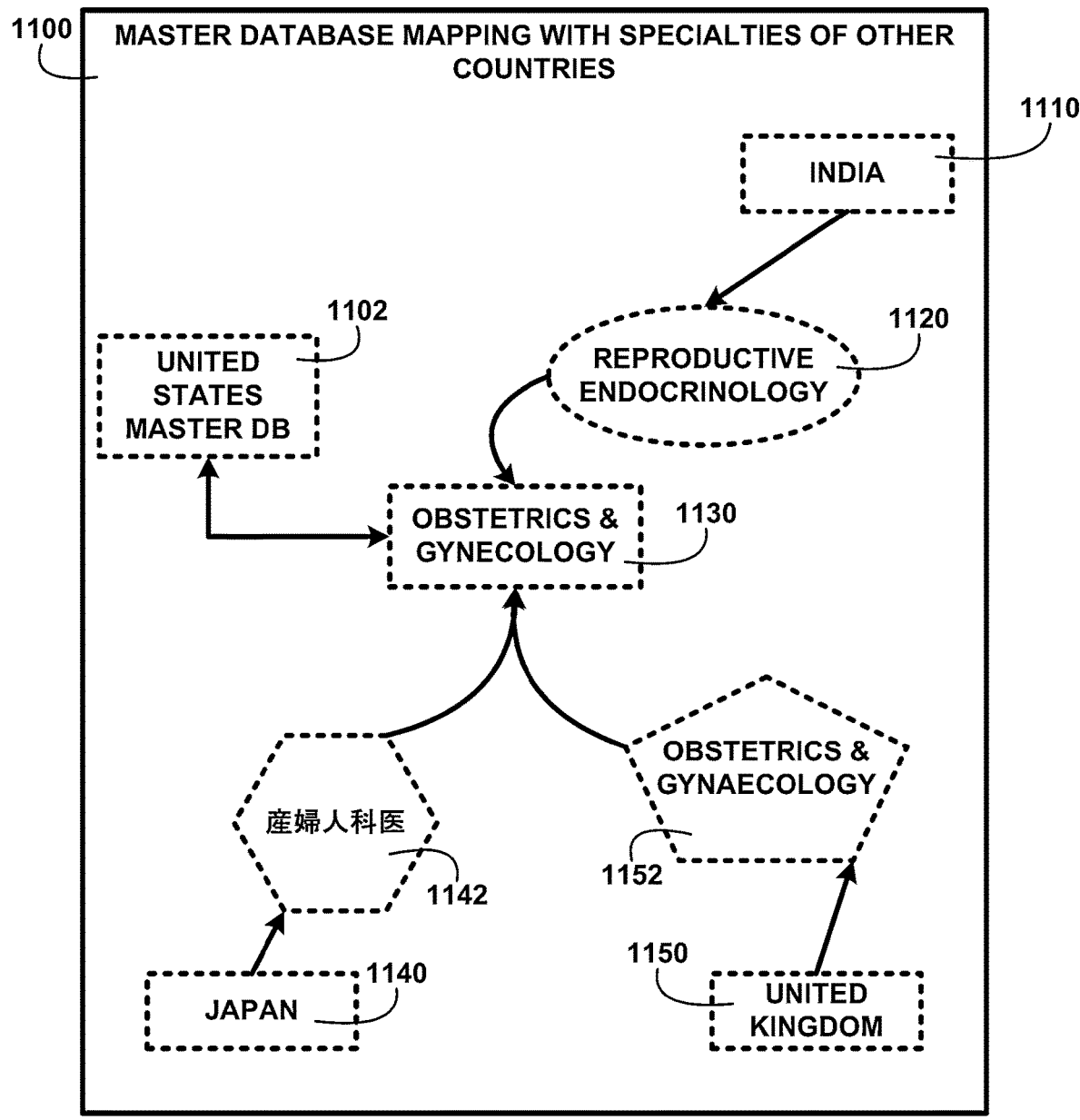
FIG. 11 shows a block diagram of an overview of master database mapping with specialties of other countries of one embodiment.

Master Database Mapping with Specialties of Other Countries:

FIG. 11 shows a block diagram of an overview of master database mapping with specialties of other countries of one embodiment. FIG. 11 shows master database mapping with specialties of other countries 1100. In this example, the country is India 1110. The high science taxonomy mapping begins with reproductive endocrinology 1120. Reproductive endocrinology 1120 is a subheading under obstetrics & gynecology 1130. The mapping is recorded in the United States master DB 1102. Another example is Japan 1140 with the Katakana 産婦人科医 1142 title of a specialty that is associated with the United States master DB 1102 listing of obstetrics and gynecology 1130. In yet another example, in the United Kingdom 1150 the spelling for this category would be Obstetrics & Gynecology 1152 as the title of a specialty that is associated with the United States master DB 1102 listing of obstetrics & gynecology 1130 in another embodiment.

Figure 12:
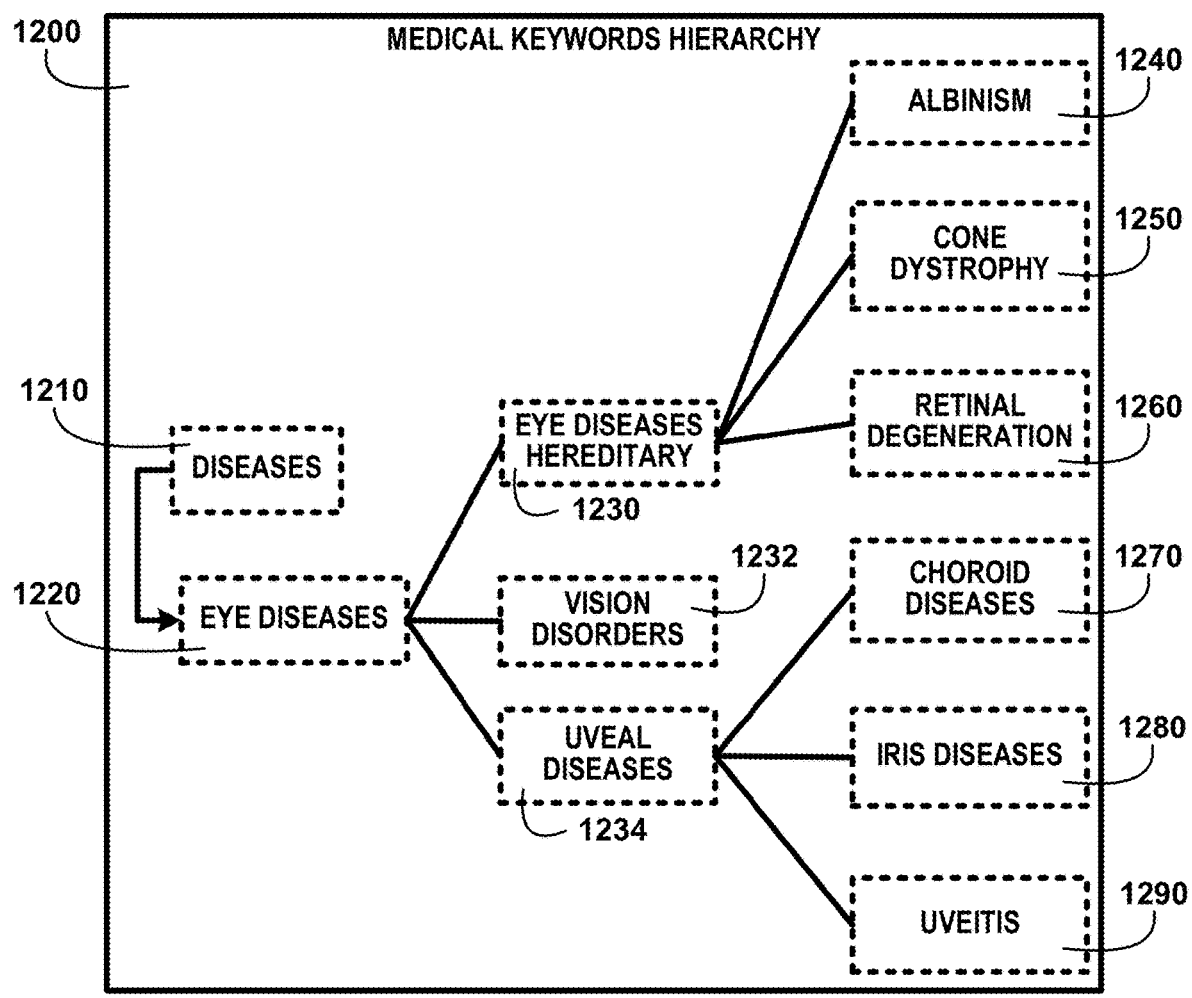
FIG. 12 shows a block diagram of an overview of the medical keywords hierarchy of one embodiment.

Medical Keywords Hierarchy:

FIG. 12 shows a block diagram of an overview of the medical keywords hierarchy of one embodiment. FIG. 12 shows an example of a medical keywords hierarchy 1200. Medical keywords are those that accompany a specialty. In this example, from the medical keywords hierarchy, 1200 diseases 1210 are the medical keyword selected. In the hierarchy below diseases, 1210 are keyword eye diseases 1220. Branching from eye diseases 1220 are keywords eye diseases hereditary 1230, vision disorders 1232, and uveal diseases 1234. Branching from diseases hereditary 1230 are albinism 1240, cone dystrophy 1250, and retinal degeneration 1260. Sub keywords from uveal diseases 1234 include choroid diseases 1270, iris diseases 1280, and uveitis 1290. Healthcare professionals' specialties are populated with the medical keywords from the medical keywords hierarchy 1200 allowing pharmaceutical companies to locate a healthcare professional in their country that specializes in the specific condition known or suspected at the time.

Figure 13:
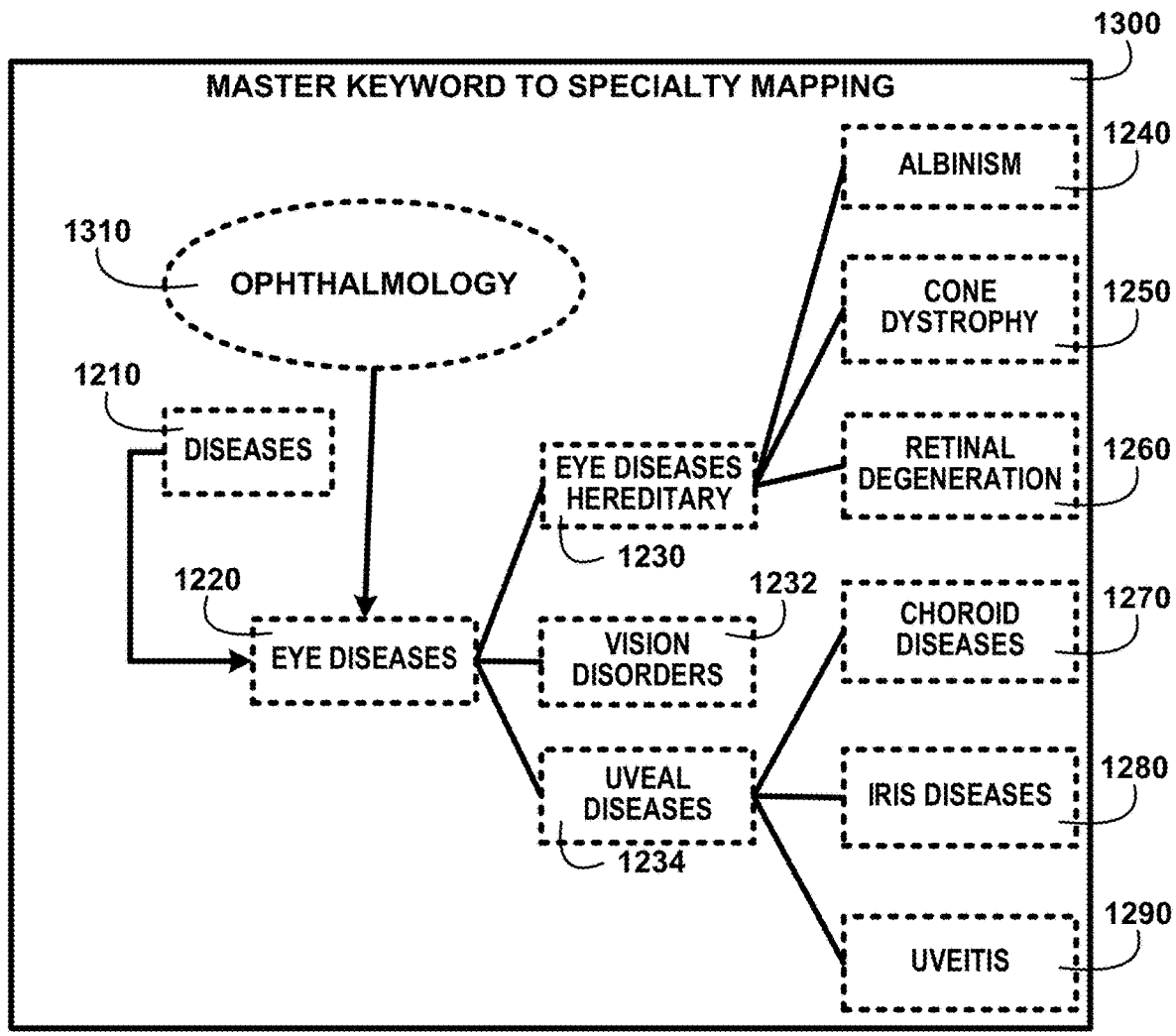
FIG. 13 shows a block diagram of an overview of master keyword to specialty mapping of one embodiment.

Master Keyword to Specialty Mapping:

FIG. 13 shows a block diagram of an overview of master keyword to specialty mapping of one embodiment. FIG. 13 shows the master keyword to specialty mapping 1300 for the healthcare field of ophthalmology 1310. The specialty mapping in this example follows the master DB 460 of FIG. 4 keywords. The vocabulary and doctor specialties both exist in master DB 460 of FIG. 4. Mapping keywords, especially on a hierarchical basis to the respective specialties facilitates locating healthcare professionals in those specialties.

In the FIG. 13 hierarchy mapping below diseases, 1210 are keyword eye diseases 1220. Branching from eye diseases 1220 are keywords eye diseases hereditary 1230, vision disorders 1232, and uveal diseases 1234. Branching from diseases hereditary 1230 are albinism 1240, cone dystrophy 1250, and retinal degeneration 1260. Sub keywords from uveal diseases 1234 include choroid diseases 1270, iris diseases 1280, and uveitis 1290. Healthcare professionals' specialties of one embodiment.

Figure 14:
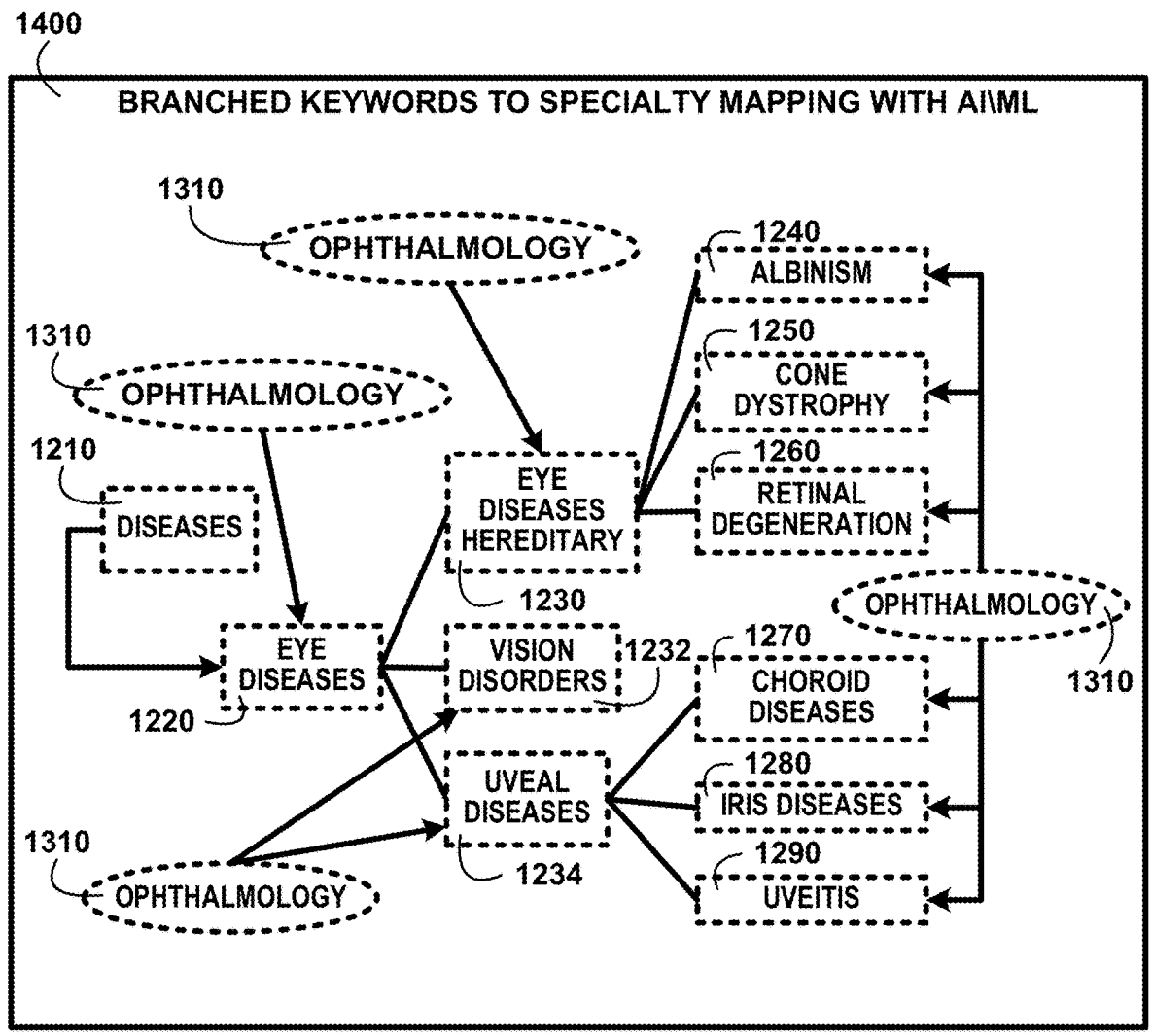
FIG. 14 shows a block diagram of an overview of branched keywords to specialty mapping with AI\ML of one embodiment.

Branched Keywords to Specialty Mapping with AI\ML:

FIG. 14 shows a block diagram of an overview of branched keywords to specialty mapping with AI\ML of one embodiment. FIG. 14 shows an example of branched keywords to specialty mapping with AI\ML 1400. In addition to the keywords for various conditions are the specialties related to those. FIG. 14 adds the specialty associated with the groups of subheadings. The hierarchy mapping below diseases 1210 is specialty keyword ophthalmology 1310 for eye diseases 1220.

Branching from eye diseases 1220 are specialty keyword ophthalmology 1310 for eye diseases hereditary 1230, and ophthalmology 1310 for vision disorders 1232, and uveal diseases 1234. Branching from eye diseases hereditary 1230 for specialty ophthalmology 1310 are albinism 1240, cone dystrophy 1250, and retinal degeneration 1260. Sub keywords from uveal diseases 1234 include specialty ophthalmology 1310 for choroid diseases 1270, iris diseases 1280, and uveitis 1290. Healthcare professionals' specialties of one embodiment.

Figure 15:
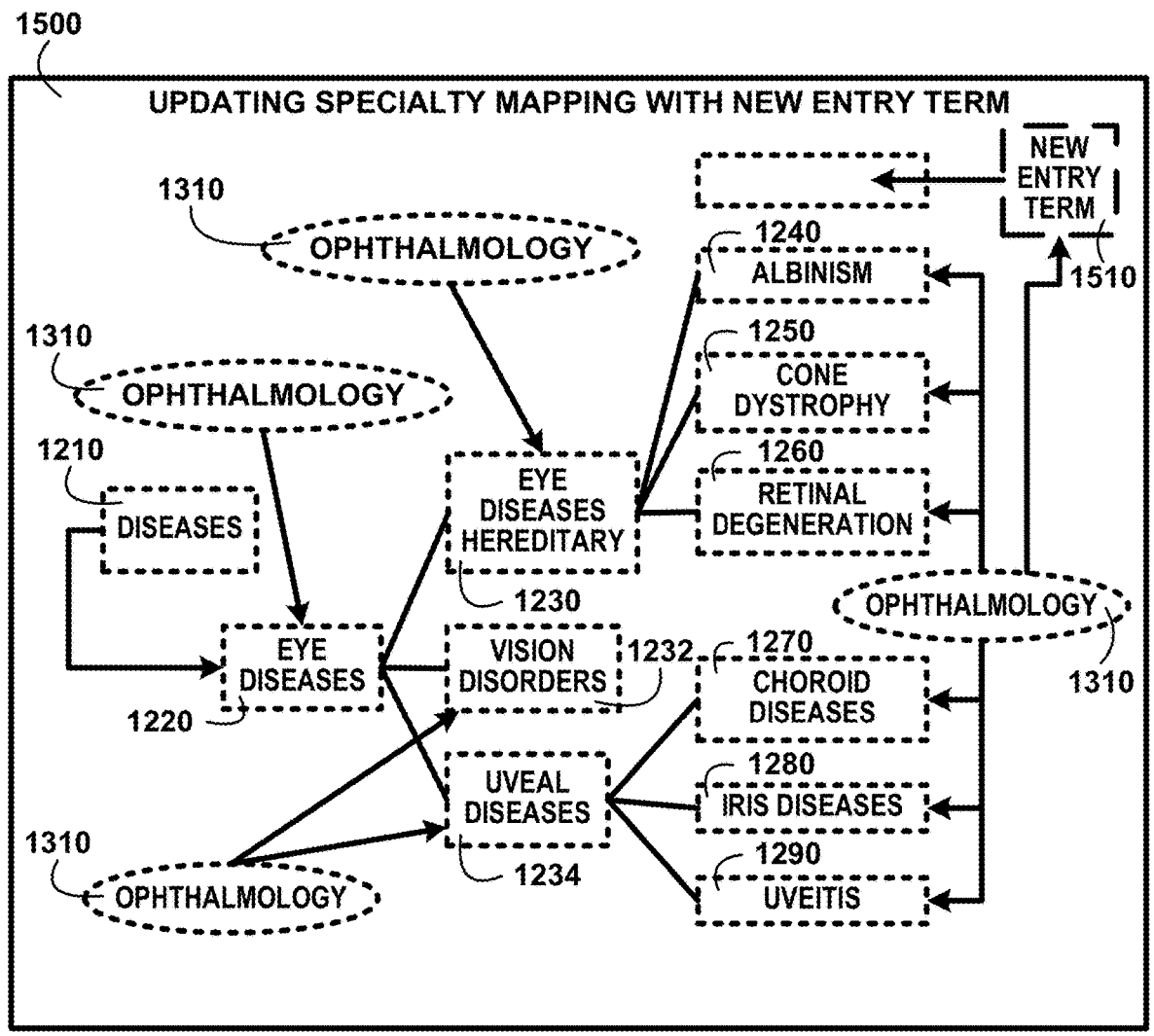
FIG. 15 shows a block diagram of an overview of updating specialty mapping with a new entry term of one embodiment.

Updating Specialty Mapping with New Entry Term:

FIG. 15 shows a block diagram of an overview of updating specialty mapping with a new entry term of one embodiment. FIG. 15 shows updating specialty mapping with new entry term 1500. Updating specialty mapping is an ongoing activity and is done periodically. New entry terms are added in the master DB 460 of FIG. 4, which is picked up by the artificial intelligence scheduling tasks job and added to the master keyword to the specialty mapping database.

FIG. 15 shows a new entry term 1510 being added to the specialty mapping example from FIG. 11. The hierarchy mapping below diseases 1210 are specialty keyword ophthalmology 1310 for eye diseases 1220. Branching from eye diseases 1220 are specialty keyword ophthalmology 1310 for eye diseases hereditary 1230, and ophthalmology 1310 for vision disorders 1232, and uveal diseases 1234. Branching from diseases hereditary 1230 for specialty ophthalmology 1310 are albinism 1240, cone dystrophy 1250, and retinal degeneration 1260. Sub keywords from uveal diseases 1234 include specialty ophthalmology 1310 for choroid diseases 1270, iris diseases 1280, and uveitis 1290 of one embodiment.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A method for displaying contextual targeted advertising to healthcare professionals, comprising:
   receiving in a master database a plurality of words that includes titles and keywords associated with plural distinct medical healthcare professional specialties for predetermined plural countries;
   generating, with a first processor, plural taxonomy and vocabulary based on the received plurality of words of the plural distinct medical healthcare professional specialties;
   tracking, with a second processor, a context of frequent browsing and reading history of online life sciences content of a healthcare professional user;
   creating, with the second processor, a country specific lexicon based on the titles, keywords, plural taxonomy, vocabulary, and the context of frequent browsing history for the plural distinct medical healthcare professional user specialties for each predetermined country in the master database;
   indexing, with the second processor, each country specific lexicon to have a cross-reference to predetermined standard medical terms in at least a predetermined language and a normalized nomenclature referring to the plural distinct medical healthcare professional user specialties;
   updating periodically, with the second processor, the country specific indexed lexicon with updated titles, keywords, plural taxonomy, vocabulary, and context of frequent browsing history in response to queries received in the master database from medical product advertisers;
   identifying, with the second processor, a distinct medical healthcare professional user specialty associated with the country specific indexed lexicon of the healthcare professional user based on matches in the master database with the context and the country specific indexed lexicon;
   comparing, with a third processor, contextual targeted advertising with the country specific indexed lexicon matches of an identified healthcare professional user specialist; and
   converting, with the third processor, advertising queries from advertisers to displayed targeted advertising presented to healthcare professional user specialists based on the country specific indexed lexicon matches.

2. The method for displaying contextual targeted advertising to healthcare professionals of claim 1, wherein the master database includes a separate taxonomy and vocabulary for different countries and languages.

3. The method for displaying contextual targeted advertising to healthcare professionals of claim 1, further comprising updating, with the first processor, each taxonomy and vocabulary periodically and adding new medical healthcare professional specialty titles and keywords to different countries and languages taxonomy and vocabulary.

4. The method for displaying contextual targeted advertising to healthcare professionals of claim 1, further comprising receiving medical subject headings in the master database converted into sub-specialties, referred to as qualifiers.

5. The method for displaying contextual targeted advertising to healthcare professionals of claim 1, further comprising cross-referencing healthcare professional medical specialties of different countries' medical professionals to match titles of specialties as classified by a first country taxonomy and vocabulary specialty hierarchy and storing in the master database.

6. The method for displaying contextual targeted advertising to healthcare professionals of claim 1, further comprising generating, with the second processor, specific medical specialties groupings of the specialties and subspecialties.

7. The method for displaying contextual targeted advertising to healthcare professionals of claim 1, further comprising generating, with the second processor, specific medical specialties classifications of each specialty.

8. The method for displaying contextual targeted advertising to healthcare professionals of claim 1, further comprising recording keywords from life sciences reading materials for specialties indexing to record in the specialties titles vocabulary.

9. A method for displaying contextual targeted advertising to healthcare professionals, comprising:

receiving in a master database a plurality of words that includes titles and keywords associated with plural distinct medical healthcare professional specialties for predetermined plural countries;

wherein the master database includes a separate taxonomy and vocabulary for different countries and languages;

generating, with a first processor, plural taxonomy and vocabulary based on the received plurality of words of the plural distinct medical healthcare professional specialties;

tracking, with a second processor, a context of frequent browsing and reading history of online life sciences content of a healthcare professional user;

creating, with the second processor, a country specific lexicon based on the titles, keywords, plural taxonomy, vocabulary, and the context of frequent browsing history for the plural distinct medical healthcare professional user specialties for each predetermined country in the master database;

indexing, with the second processor, each country specific lexicon to have a cross-reference to predetermined standard medical terms in at least a predetermined language and a normalized nomenclature referring to the plural distinct medical healthcare professional user specialties;

updating periodically, with the second processor, the country specific indexed lexicon with updated titles, keywords, plural taxonomy, vocabulary, and context of frequent browsing history in response to queries received in the master database from medical product advertisers;

identifying, with the second processor, a distinct medical healthcare professional user specialty associated with the country specific indexed lexicon of the healthcare professional user based on matches in the master database with the context and the country specific indexed lexicon;

comparing, with a third processor, contextual targeted advertising with the country specific indexed lexicon matches of an identified healthcare professional user specialist; and converting, with the third processor, advertising queries from advertisers to displayed targeted advertising presented to healthcare professional user specialists based on the country specific indexed lexicon matches.

10. The method for displaying contextual targeted advertising to healthcare professionals of claim 9, further comprising cross-referencing, with the second processor, coupled to the master database to reference specialties of different countries' medical professionals based on the specialties to match at least one taxonomy and vocabulary titles of specialties as classified by a first country specialty hierarchy and stored in the master database.

11. The method for displaying contextual targeted advertising to healthcare professionals of claim 9, further comprising generating, with the second processor, specific medical specialties groupings of the specialties and subspecialties.

12. The method for displaying contextual targeted advertising to healthcare professionals of claim 9, further comprising using an application programming interface coupled to the second processor configured to generate healthcare professionals' medical specialties from the healthcare professional user's tracked pattern of reading of online life sciences content.

13. The method for displaying contextual targeted advertising to healthcare professionals of claim 9, further comprising generating, with the first processor, further configured to generate keywords to search life sciences books and journals to record in at least one of the plural taxonomy and vocabulary.

14. The method for displaying contextual targeted advertising to healthcare professionals of claim 9, further comprising updating, with a third processor, each country's taxonomy and vocabulary periodically and adding new medical healthcare professional specialty titles and keywords respectively to each country's taxonomy and vocabulary.

15. An apparatus, comprising:
a master database configured to receive a plurality of words that includes titles and keywords associated with plural distinct medical healthcare professional specialties for predetermined plural countries;

a first processor configured to generate plural taxonomy and vocabulary based on the received plurality of words of the plural distinct medical healthcare professional specialties;

a second processor configured to track a context of frequent browsing and reading history of online life sciences content of a healthcare professional user;

a second processor coupled to the master database configured to create a country specific lexicon based on the titles, keywords, plural taxonomy, vocabulary, and the context of frequent browsing history for the plural distinct medical healthcare professional user specialties for each predetermined country in the master database;

wherein the second processor is further configured to identify a distinct medical healthcare professional specialty associated with the healthcare professional user based on standard medical terms matches in the master database with the context;

wherein the second processor is further configured to index each country specific lexicon to have a cross-reference to predetermined standard medical terms in at least a predetermined language and a normalized nomenclature referring to the plural distinct medical healthcare professional user specialties;

wherein the second processor is further configured to update periodically the country specific indexed lexicon with updated titles, keywords, plural taxonomy, vocabulary, and context of frequent browsing history in response to queries received in the master database from medical product advertisers;

wherein the second processor is further configured to identify a distinct medical healthcare professional user specialty associated with the country specific indexed lexicon of the healthcare professional user based on matches in the master database with the context and the country specific indexed lexicon;

a third processor configured to compare contextual targeted advertising with the country matches of an identified healthcare professional user specialist; and wherein the third processor is further configured to convert advertising queries from medical product advertisers to displayed targeted advertising presented to healthcare professional user specialists based on the country specific indexed lexicon matches.

16. The apparatus of claim 15, further comprising a cross-referencing device coupled to the master database configured to compare specialties of different countries' medical professionals by converting the specialties to match titles of specialties as classified by a first country taxonomy and vocabulary specialty hierarchy and stored in the master database.

17. The apparatus of claim 15, wherein the master database includes a separate taxonomy and vocabulary for different countries and languages.

18. The apparatus of claim 15, further comprising main subject headings recorded in the master database are configured to be converted into sixteen medical subject headings categories.

19. The apparatus of claim 15, further comprising an application programming interface coupled to the first processor configured to generate healthcare professionals' medical specialties from the tracked online reading pattern content accessed by healthcare professionals' browsing of a life sciences reading materials database.

20. The apparatus of claim 15, wherein the third processor is further configured to update the plural taxonomy and vocabulary periodically and to add new medical healthcare professional specialty titles and keywords to different countries and languages taxonomy and vocabulary.

\* \* \* \* \*